(12) United States Patent
Davis et al.

(10) Patent No.: US 7,953,696 B2
(45) Date of Patent: May 31, 2011

(54) REAL-TIME SYNCHRONIZATION OF XML DATA BETWEEN APPLICATIONS

(75) Inventors: Tristan A. Davis, Redmond, WA (US); Ali Taleghani, Redmond, WA (US); Brian M. Jones, Redmond, WA (US); Marcin Sawicki, Kirkland, WA (US); Robert A. Little, Redmond, WA (US); Shiraz Cupala, Seattle, WA (US); Dragos Barac, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/332,468

(22) Filed: Jan. 13, 2006

(65) Prior Publication Data

US 2007/0061382 A1 Mar. 15, 2007

Related U.S. Application Data

(60) Provisional application No. 60/715,986, filed on Sep. 9, 2005.

(51) Int. Cl.
*G06F 7/00* (2006.01)
*G06F 17/00* (2006.01)

(52) U.S. Cl. ........ 707/608; 707/636; 707/683; 707/684; 707/705

(58) Field of Classification Search .................. 707/101, 707/201, 608, 705, 781, 783, 613, 636, 683, 707/684

See application file for complete search history.

(56) References Cited

U.S. PATENT DOCUMENTS

| | | | | |
|---|---|---|---|---|
| 5,287,504 A | * | 2/1994 | Carpenter et al. | 707/201 |
| 5,440,745 A | | 8/1995 | Platte et al. | 718/101 |
| 5,630,131 A | | 5/1997 | Palevich et al. | 717/108 |
| 5,715,415 A | | 2/1998 | Dazey et al. | 715/708 |
| 5,717,741 A | | 2/1998 | Yue et al. | 379/88.12 |
| 5,787,449 A | | 7/1998 | Vulpe et al. | 715/203 |
| 5,845,299 A | | 12/1998 | Arora et al. | 715/209 |
| 5,903,902 A | | 5/1999 | Orr et al. | 715/202 |

(Continued)

FOREIGN PATENT DOCUMENTS

JP 11-306178 11/1999

(Continued)

OTHER PUBLICATIONS

Leslie, "Using Javadoc and XML to Product API Reference Documentation," SIGDOC' 02,Oct. 23, 2002, ACM Press, p. 104-109.

(Continued)

*Primary Examiner* — James Trujillo
*Assistant Examiner* — Marc Somers
(74) *Attorney, Agent, or Firm* — Merchant & Gould

(57) ABSTRACT

One or more data stores are maintained separately from a primary presentation storage within a document for storing, relating and for allowing use of arbitrary data that is associated with a computer-generated document between multiple data consumers. The data store exposes application programming interfaces (APIs) to the various pieces of data in the data store for allowing different data consumers to access and operate on one or more of the data pieces in real time. Multiple data consumers may access and edit the same piece of data concurrently, and any conflicting changes to a given piece of data are resolved. Each data consumer may accept or reject the change as well as make additional side-effect changes as a result of the original change. In this way, the data may be synchronized in real time across the data consumers.

19 Claims, 8 Drawing Sheets

U.S. PATENT DOCUMENTS

| | | | |
|---|---|---|---|
| 5,910,075 A | 6/1999 | Arnell et al. .................... 49/25 |
| 5,911,068 A | 6/1999 | Zimmerman et al. ........ 719/328 |
| 5,974,430 A | 10/1999 | Mutschler et al. ............ 715/505 |
| 5,991,878 A | 11/1999 | McDonough et al. ............ 726/9 |
| 6,006,239 A * | 12/1999 | Bhansali et al. .............. 707/201 |
| 6,014,677 A | 1/2000 | Hayashi et al. ............ 707/104.1 |
| 6,088,431 A | 7/2000 | LaDue ....................... 379/114.2 |
| 6,157,940 A | 12/2000 | Marullo et al. .................. 703/27 |
| 6,247,020 B1 | 6/2001 | Minard ...................... 707/104.1 |
| 6,275,824 B1 | 8/2001 | O'Flaherty et al. ............... 707/9 |
| 6,317,777 B1 | 11/2001 | Skarbo et al. ................. 709/204 |
| 6,397,351 B1 * | 5/2002 | Miller et al. ..................... 714/13 |
| 6,457,002 B1 | 9/2002 | Beattie et al. ..................... 707/3 |
| 6,490,601 B1 | 12/2002 | Markus et al. ................ 715/507 |
| 6,507,856 B1 | 1/2003 | Chen et al. .................... 715/205 |
| 6,562,076 B2 | 5/2003 | Edwards et al. .............. 715/229 |
| 6,571,253 B1 | 5/2003 | Thompson et al. ........ 707/103 R |
| 6,629,843 B1 | 10/2003 | Bunting et al. ................ 434/118 |
| 6,731,314 B1 | 5/2004 | Cheng et al. .................. 715/848 |
| 6,859,821 B1 * | 2/2005 | Ozzie et al. ................... 709/205 |
| 6,865,599 B2 | 3/2005 | Zhang ........................... 709/218 |
| 6,915,482 B2 * | 7/2005 | Jellum et al. .................. 715/234 |
| 6,920,455 B1 | 7/2005 | Weschler ....................... 707/100 |
| 6,944,622 B1 | 9/2005 | Mitchell et al. ............... 707/102 |
| 6,944,662 B2 | 9/2005 | Devine et al. ................. 709/225 |
| 6,950,990 B2 | 9/2005 | Rajarajan et al. ............. 715/736 |
| 6,996,769 B1 | 2/2006 | Peikes et al. |
| 7,017,112 B2 | 3/2006 | Collie et al. .................... 715/513 |
| 7,035,839 B1 | 4/2006 | Gillespie et al. .................. 707/2 |
| 7,039,708 B1 | 5/2006 | Knobl et al. ................... 709/227 |
| 7,039,863 B1 | 5/2006 | Caro et al. ..................... 715/530 |
| 7,085,773 B2 | 8/2006 | Dorsett, Jr. ................. 707/104.1 |
| 7,111,284 B2 | 9/2006 | Takagi et al. ......... 707/E17.006 |
| 7,117,504 B2 | 10/2006 | Smith et al. ................... 719/328 |
| 7,200,816 B2 | 4/2007 | Falk et al. ..................... 715/762 |
| 7,237,002 B1 | 6/2007 | Estrada et al. ................ 709/203 |
| 7,340,481 B1 | 3/2008 | Baer et al. .................. 707/104.1 |
| 7,386,563 B1 | 6/2008 | Pal ................................ 707/102 |
| 7,509,305 B2 | 3/2009 | Tozawa et al. ................... 707/3 |
| 7,562,342 B2 | 7/2009 | Berg et al. .................... 717/106 |
| 7,657,832 B1 | 2/2010 | Lin ............................... 715/234 |
| 2001/0056463 A1 | 12/2001 | Grady et al. .................. 709/203 |
| 2002/0010716 A1 | 1/2002 | McCartney et al. .......... 707/517 |
| 2002/0013792 A1 | 1/2002 | Imielinski et al. ............ 707/523 |
| 2002/0065110 A1 | 5/2002 | Enns et al. .................... 455/566 |
| 2002/0085020 A1 | 7/2002 | Carroll ......................... 345/700 |
| 2002/0107867 A1 | 8/2002 | Takagi et al. ................. 707/102 |
| 2002/0133516 A1 | 9/2002 | Davis et al. ................... 707/513 |
| 2002/0161801 A1 | 10/2002 | Hind et al. .................... 707/513 |
| 2002/0198962 A1 | 12/2002 | Horn et al. .................... 709/218 |
| 2003/0007009 A1 | 1/2003 | Haley ............................ 345/805 |
| 2003/0018666 A1 | 1/2003 | Chen et al. .................... 707/513 |
| 2003/0018714 A1 | 1/2003 | Mikhailov et al. ............ 709/203 |
| 2003/0023632 A1 | 1/2003 | Ries et al. ..................... 707/513 |
| 2003/0023953 A1 | 1/2003 | Lucassen et al. .............. 717/106 |
| 2003/0051054 A1 | 3/2003 | Redlich et al. ................ 709/246 |
| 2003/0097457 A1 | 5/2003 | Saran et al. ................... 709/230 |
| 2003/0159111 A1 | 8/2003 | Fry ................................ 715/513 |
| 2003/0163603 A1 | 8/2003 | Fry et al. ....................... 709/203 |
| 2003/0164859 A1 | 9/2003 | Evans ........................... 345/792 |
| 2003/0174162 A1 | 9/2003 | Wu ................................ 345/736 |
| 2004/0021679 A1 | 2/2004 | Chapman et al. ............. 345/700 |
| 2004/0073565 A1 | 4/2004 | Kaufman et al. ............. 707/101 |
| 2004/0088332 A1 | 5/2004 | Lee et al. ...................... 707/200 |
| 2004/0088647 A1 | 5/2004 | Miller et al. .................. 715/500 |
| 2004/0098667 A1 | 5/2004 | Atkinson ...................... 715/513 |
| 2004/0103147 A1 | 5/2004 | Flesher et al. ................ 709/204 |
| 2004/0111672 A1 | 6/2004 | Bowman et al. .............. 715/513 |
| 2004/0153467 A1 | 8/2004 | Conover et al. ............... 707/100 |
| 2004/0183830 A1 | 9/2004 | Cody et al. ................... 715/747 |
| 2004/0199876 A1 | 10/2004 | Ethier et al. .................. 715/523 |
| 2004/0205565 A1 | 10/2004 | Gupta ........................... 715/513 |
| 2004/0205653 A1 | 10/2004 | Hadfield et al. .............. 715/530 |
| 2004/0217985 A9 | 11/2004 | Ries et al. ..................... 715/740 |
| 2004/0220926 A1 | 11/2004 | Lamkin et al. ................... 707/3 |
| 2004/0225958 A1 | 11/2004 | Halpert et al. ................ 715/513 |
| 2004/0237036 A1 | 11/2004 | Quist et al. ................... 715/513 |
| 2004/0243938 A1 | 12/2004 | Weise et al. .................. 715/526 |
| 2004/0268240 A1 | 12/2004 | Vincent ......................... 715/513 |
| 2005/0014494 A1 | 1/2005 | Owen et al. ................... 455/419 |
| 2005/0027618 A1 | 2/2005 | Zucker et al. ................... 705/26 |
| 2005/0033667 A1 | 2/2005 | Sugimoto et al. .............. 705/28 |
| 2005/0033766 A1 | 2/2005 | Pang et al. ................. 707/104.1 |
| 2005/0034079 A1 | 2/2005 | Gunasekar et al. ........... 715/753 |
| 2005/0044145 A1 | 2/2005 | Quinn et al. .................. 709/205 |
| 2005/0050066 A1 | 3/2005 | Hughes ......................... 707/100 |
| 2005/0068913 A1 | 3/2005 | Tan et al. ...................... 370/310 |
| 2005/0071477 A1 | 3/2005 | Evans et al. .................. 709/228 |
| 2005/0076295 A1 | 4/2005 | Simske et al. ................ 715/517 |
| 2005/0086384 A1 | 4/2005 | Ernst ............................. 709/248 |
| 2005/0091346 A1 | 4/2005 | Krishnaswami et al. ..... 709/220 |
| 2005/0091576 A1 | 4/2005 | Relyea et al. ................. 715/502 |
| 2005/0114771 A1 | 5/2005 | Piehler et al. ................. 715/536 |
| 2005/0154978 A1 | 7/2005 | Albornoz et al. ............. 715/513 |
| 2005/0183001 A1 | 8/2005 | Carter et al. ................ 715/501.1 |
| 2005/0187973 A1 * | 8/2005 | Brychell et al. ........... 707/104.1 |
| 2005/0188349 A1 | 8/2005 | Bent et al. ..................... 717/106 |
| 2005/0188350 A1 | 8/2005 | Bent et al. ..................... 717/106 |
| 2005/0289457 A1 | 12/2005 | Obasanjo et al. ............. 715/513 |
| 2006/0031755 A1 | 2/2006 | Kashi ............................ 715/512 |
| 2006/0036692 A1 | 2/2006 | Morinigo et al. ............. 709/206 |
| 2006/0041558 A1 | 2/2006 | McCauley et al. ............. 707/10 |
| 2006/0048112 A1 | 3/2006 | Thiagarajan et al. ......... 717/144 |
| 2006/0053158 A1 | 3/2006 | Hall et al. ..................... 707/102 |
| 2006/0053194 A1 | 3/2006 | Schneider et al. ............ 709/204 |
| 2006/0069987 A1 | 3/2006 | Jones et al. ................... 715/520 |
| 2006/0069989 A1 | 3/2006 | Jones et al. ................... 715/526 |
| 2006/0080590 A1 | 4/2006 | Jones et al. ................... 715/500 |
| 2006/0136441 A1 * | 6/2006 | Fujisaki ........................ 707/101 |
| 2006/0150085 A1 | 7/2006 | Davis et al. ................... 715/513 |
| 2006/0195413 A1 | 8/2006 | Davis et al. ....................... 707/1 |
| 2006/0195777 A1 | 8/2006 | Davis et al. ................... 715/500 |
| 2006/0195783 A1 | 8/2006 | Davis et al. ................... 715/513 |
| 2006/0282452 A1 | 12/2006 | Takagi et al. ......... 707/E17.006 |
| 2007/0061382 A1 | 3/2007 | Davis et al. ................... 707/201 |
| 2007/0118554 A1 | 5/2007 | Chang et al. .................. 707/102 |

FOREIGN PATENT DOCUMENTS

| | | |
|---|---|---|
| JP | 2001-052087 | 2/2001 |
| JP | 2001-0125895 | 5/2001 |
| JP | 2002-118734 | 4/2002 |
| JP | 2002-229723 | 8/2002 |
| JP | 2004-054842 | 2/2004 |
| RU | 2004136278 A | 8/2005 |
| WO | WO 01/08033 A2 | 2/2001 |
| WO | WO 01/08033 A3 | 2/2001 |
| WO | WO 01/11486 A2 | 2/2001 |
| WO | WO 01/11486 A3 | 2/2001 |
| WO | WO 01/15004 A2 | 3/2001 |
| WO | WO 01/95155 A2 | 12/2001 |
| WO | WO 01/95155 A3 | 12/2001 |

OTHER PUBLICATIONS

Ladd et al., "Using HTML 4, XML and Java 1.2," Dec 1998, Que, Platinum Edition, p. 693-701.

Memorandum and four figures regarding StarOffice 5.1; date is unknown, but believed to be earlier than Jan. 5, 2001, 5 pp.

Habraken, Jr., StarOffice 5.2 Calc Handbook, Prentice Hall, Dec. 2000, Chapter 2, 5 pp.

Comai et al., "Computing Graphical Queries Over XML Data", ACM Transactions on Information Systems TOIS, Oct. 2001, ACM Press, vol. 19 No. 4, 371-430 pp.

Sun et al., "Operational Transformation for Collaborative Word Processing", Proceedings of the Conference of CSCW'04, Nov. 10, 2004, ACM Press, p. 437-446.

Altova, "xmlspy5: User & Reference Manual", Jan. 3, 2003, www.altova.com, pp. 13-30, 698-701, 890.

McKenzie et al., "XFA Template Version 1.0", http://www.w3.org/1999/05/XFA/xfa-template, retrieved on May 30, 2008, 60 pp.

Heslop et al., "Word 2003 Bible", Wiley Publishing, 2003, pp. 441-443.

Souchon et al., "A Review of XML-compliant User-Interface Description Languages," LNCS, copyright Springer-Verlag 2003, pp. 377-391.

Meyer, "A Tool-Creating Validated XML Documents on the Fly Using MS Word," SIGDOC, copyright Oct. 2002, ACM, pp. 113-121.
Sun_Micro, How to Write Doc Comments for the Javadoc Tool, Sep. 2004, pp. 1-16.
Sala, et al., ML 3.0 Smoothed Aggregation User's Guide, Computational Math and Algorithms, Sandia Notational Laboratories, May 2004, pp. 3-66.
Narravula et al., "Supporting Strong Coherency for Active Caches in Multi-Tier Data-Centers over InfiniBand", ANL.gov, 2004, pp. 1-10 (retrieved from CiteseerX May 5, 2009).
Narravula et al., "Designing Efficient Cooperative Caching Schemes for Multi-Tier Data-Centers over RDMA-enabled Networks", OCU-CISRC-6/05-TR39, Jun. 2005, pp. cover page, 1-10 (retrieved from Internet May 5, 2009).
Official Action in U.S. Appl. No. 10/955,612 dated Sep. 19, 2006.
Official Action in U.S. Appl. No. 11/030,423 dated Nov. 22, 2006.
Official Action in U.S. Appl. No. 11/030,423 dated May 15, 2007.
Official Action in U.S. Appl. No. 10/955,612 dated May 18, 2007.
Official Action in U.S. Appl. No. 11/066,083 dated Jun. 4, 2007.
Official Action in U.S. Appl. No. 11/066,117 dated Jun. 21, 2007.
Official Action in U.S. Appl. No. 11/067,383 dated Jun. 28, 2007.
Official Action in U.S. Appl. No. 11/331,586 dated Jul. 26, 2007.
Official Action in U.S. Appl. No. 11/030,423 dated Oct. 4, 2007.
Official Action in U.S. Appl. No. 11/331,586 dated Dec. 27, 2007.
Official Action in U.S. Appl. No. 11/066,117 dated Feb. 15, 2008.
Official Action in U.S. Appl. No. 10/955,612 dated Mar. 10, 2008.
Official Action in U.S. Appl. No. 11/066,083 dated Mar. 11, 2008.
Official Action in U.S. Appl. No. 11/065,754 dated Jun. 13, 2008.
Official Action in U.S. Appl. No. 11/030,423 dated Jul. 10, 2008.
Official Action in U.S. Appl. No. 11/331,586 dated Sep. 29, 2008.
Official Action in U.S. Appl. No. 11/066,058 dated Oct. 1, 2008.
Official Action in U.S. Appl. No. 11/066,117 dated Oct. 14, 2008.
Official Action in U.S. Appl. No. 10/955,612 dated Dec. 3, 2008.
Official Action in U.S. Appl. No. 11/066,083 dated Dec. 9, 2008.
Official Action in U.S. Appl. No. 11/065,754 dated Jan. 22, 2009.
Official Action in U.S. Appl. No. 11/030,423 dated Feb. 18, 2009.
Official Action in U.S. Appl. No. 11/066,177 dated Apr. 8, 2009.
Official Action in U.S. Appl. No. 11/066,058 dated Apr. 13, 2009.
Official Action in U.S. Appl. No. 11/331,586 dated May 12, 2009.
Official Action in U.S. Appl. No. 10/955,612 dated Jun. 25, 2009.
PCT Search Report dated Jan. 16, 2007 in PCT/US2006/034802.
European Search Report dated Mar. 31, 2006 in EP 06100594.8.
European Search Report dated Dec. 19, 2007 in EP 05112126.7.
European Search Report dated Dec. 19, 2007 in EP 05112131.7.
European Examination Report dated Mar. 3, 2008 in EP 05112126.7.
European Examination Report dated Mar. 3, 2008 in EP 05112131.7.
European Search Report dated Jun. 12, 2008 in EP 05105427.8.
European Communication dated May 13, 2009 in EP 05105427.8.
Chinese First Office Action dated May 9, 2008 in 200500885 14.8.
Chinese First Office Action dated Jul. 4, 2008 in 200510128896.2.
Chinese First Office Action dated Aug. 29, 2008 in 200510128895.8.
Chinese First Office Action dated Nov. 7, 2008 in 200610007194.3.
Chinese Second Office Action dated Nov. 21, 2008 in 200510088514.8.
Chinese Third Office Action dated Jun. 5, 2009 in 200510088514.8.
Mascolo et al., "XMiddle a Data-Sharing Middleware for Mobile Computing", Wireless Personal Communications, Springer, Dordrecht, NL, vol. 21, No. 1, Apr. 1, 2002, pp. 77-103.
Bodart et al., "Architecture Elements for Highly-Interactive Business-Oriented Applications", Lecture Notes in Computer Science, Springer Berlin/Heidelberg, vol. 753/1993, copyright 1993, pp. 83-104.
Official Action in U.S. Appl. No. 11/065,754 dated Jul. 8, 2009.
Official Action in U.S. Appl. No. 11/066,058 mailed Sep. 24, 2009.
Official Action in U.S. Appl. No. 11/030,423 dated Sep. 25, 2009.
Official Action in U.S. Appl. No. 11/066,083 dated Oct. 6, 2009.
Official Action in U.S. Appl. No. 10/955,612 dated Nov. 12, 2009.
Official Action in U.S. Appl. No. 11/331,586 dated Nov. 13, 2009.
Official Action in U.S. Appl. No. 11/066,058 mailed Mar. 18, 2010.
European Search Report dated Oct. 6, 2009 in EP 06824911.9-1225.
Chinese First Office Action dated Jul. 24, 2009 in 200680033069.8.
Chinese First Office Action dated Aug. 28, 2009 in 200680033162.9.
Chinese Second Office Action dated Nov. 13, 2009 in 200510128895.8.
Russian Office Action dated Dec. 18, 2009 in 2006101270.
Australian Examiner's First Report dated Dec. 1, 2010 in 2006287364.
Official Action in U.S. Appl. No. 11/066,083 mailed Jun. 1, 2010.
Chinese Second Office Action dated Jun. 29, 2010 in 200680033069.8.
Chinese Second Office Action dated Jul. 2, 2010 in 200680033162.9.
Australian Examiner's First Report dated Sep. 21, 2010 in 2006200047.
Japanese Notice of Rejection dated Jan. 14, 2011 in 2005-183577.
Japanese Notice of Rejection dated Feb. 4, 2011 in 2005-352580.
Japanese Notice of Rejection dated Feb. 4, 2011 in 2005-367248.

* cited by examiner

*Title:* Data Binding – Live Sync  ~405

Properties

| Team: | Feature Area: | Feature Sub Area: |
|---|---|---|
| ▼ | ▼ | ▼ |
| Program Manager: | Developer: | Tester: |
| Tristan Davis | Ali Taleghani | |
| Design | Usability | Localization: |
| | | |

~420

*Required properties remain

O12 — Data Binding – Live Sync Integration ~410
"Catchy Slogan"
Status: Placeholder       Last Updated: 12/1/2004 1:07 PM

| Team | Word | Milestone | M3 | Priority | 1 |
|---|---|---|---|---|---|
| Program Manager | Tristan Davis | Usability | | | |
| Developer | Ali Taleghani | Product Planning | | | |

~415

Significant changes made after the Review will be noted in Green, like this is.
Significant changes made after the Critique will be noted in Yellow, like this is.
Significant bug changes after Coding Starts will be noted in Red, like this is.
Significant DCRs after Code Complete will be noted in Black, like this is.

1. Abstract........................................................................2
2. Overview & Scope.........................................................2
3. Definitions....................................................................2
4. Prototype......................................................................2
5. Goals............................................................................2

~425

*Title:* Foo Bar Baz  ~435

Properties

| Team: | Feature Area: | Feature Sub Area: |
|---|---|---|
| ▼ | ▼ | ▼ |
| Program Manager: | Developer: | Tester: |
| Tristan Davis | Ali Taleghani | |
| Design | Usability | Localization: |
| | | |

*Required properties remain

O12 — Foo Bar Baz ~440
"Catchy Slogan"
Status: Placeholder       Last Updated: 12/1/2004 1:07 PM

| Team | Word | Milestone | M3 | Priority | 1 |
|---|---|---|---|---|---|
| Program Manager | Tristan Davis | Usability | | | |
| Developer | Ali Taleghani | Product Planning | | | |

Significant changes made after the Review will be noted in Green, like this is.
Significant changes made after the Critique will be noted in Yellow, like this is.
Significant bug changes after Coding Starts will be noted in Red, like this is.
Significant DCRs after Code Complete will be noted in Black, like this is.

1. Abstract........................................................................2
2. Overview & Scope.........................................................2
3. Definitions....................................................................2
4. Prototype......................................................................2
5. Goals............................................................................2

Fig. 4

REAL-TIME SYNCHRONIZATION OF XML DATA BETWEEN APPLICATIONS

RELATED APPLICATION

This utility patent application claims the benefit under 35 United States Code §119(e) of U.S. Provisional Patent Application No. 60/715,986 filed on Sep. 9, 2005, which is hereby incorporated by reference in its entirety.

BACKGROUND

Computer users have grown accustomed to user-friendly software applications that help them write, calculate, organize, prepare presentations, send and receive electronic mail, make music, and the like. For example, word processing applications allow users to prepare a variety of useful documents. Spreadsheet applications allow users to enter, manipulate, and organize data. Slide presentation applications allow users to create a variety of slide presentations containing text, pictures, data or other useful objects.

Documents created by such applications (e.g. word processing documents, spreadsheets, slide presentation documents), however, have a limited facility for storing/transporting the contents of arbitrary metadata required by the context of the documents. For example, a solution built on top of a word processing document may require the storage of workflow data that describes various states of the document, for example, previous workflow approval states (dates, times, names), current approval states, future workflow states before completion, name and office address of document author, document changes, and the like. The options for storing this information are primarily limited to the use of document variables or existing custom object linking and embedding (OLE) document properties that have limitations. For example, hierarchical data may not be stored; character length is limited, and the like. The properties for such methods are stored in a single store, for example, an OLE properties store, which means the properties have a possibility of conflicting. Further, such stored properties have no data validation. It is difficult for users of such applications and related documents to store arbitrary data with documents, which is a common need of many users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One or more data stores are maintained separately from a primary presentation storage within a document for storing, relating and for allowing use of arbitrary data that is associated with a computer-generated document between multiple data consumers. Data for structuring information associated with a document, such as document metadata, is maintained in a data store where relationships between different pieces of data are maintained. The data store exposes application programming interfaces (APIs) to the various pieces of data in the data store for allowing different data consumers to access and operate on one or more of the data pieces in real time. Multiple data consumers may access and edit the same piece of data concurrently, and any conflicting changes to a given piece of data are resolved. Each data consumer may accept or reject the change as well as make additional side-effect changes as a result of the original change. In this way, the data may be synchronized in real time across the data consumers.

The pieces of data may be structured according to a markup language such as the Extensible Markup Language (XML). XML schemas may be associated with each piece of data, and the data store may automatically validate the XML structure of the data based on an XML schema associated with a given piece of data. This helps in preventing invalid changes from being allowed to enter the system.

BRIEF DESCRIPTION OF THE DRAWINGS

FIG. 4 illustrates an example of live synchronization;

DETAILED DESCRIPTION

Figure 1:
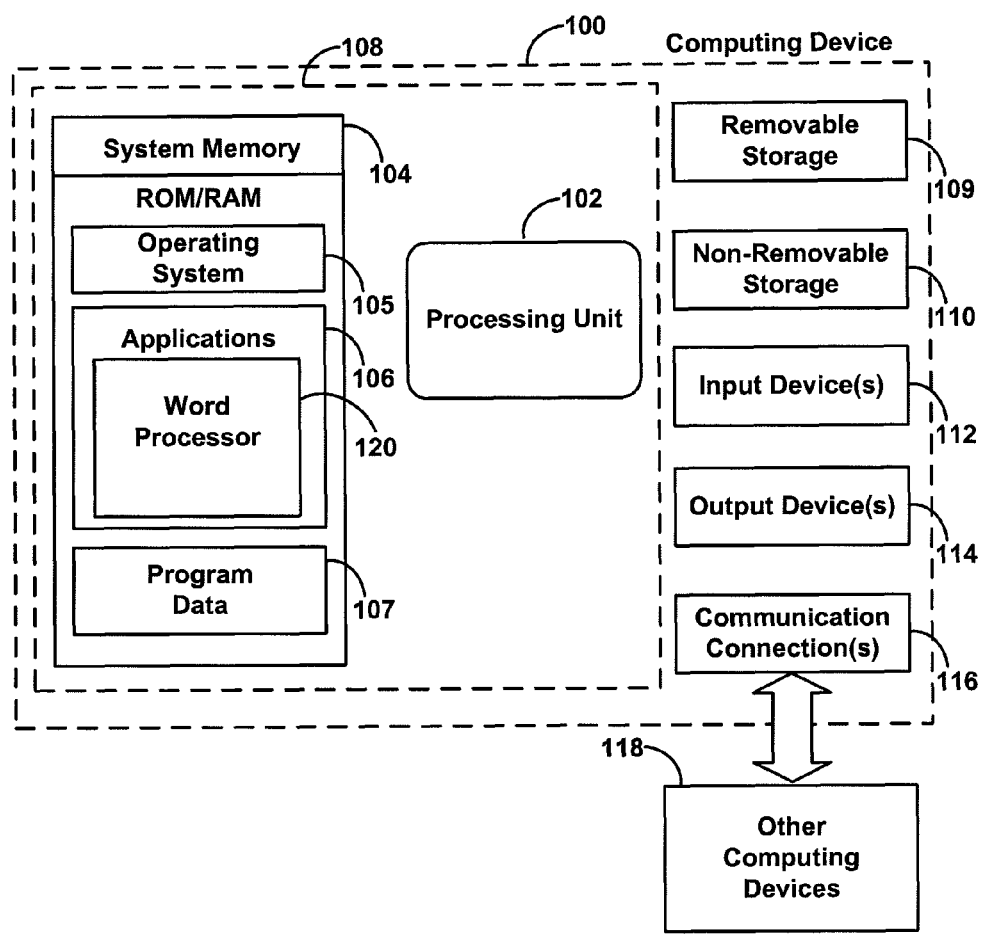
FIG. 1 illustrates an exemplary computing architecture for a computer.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Throughout the specification and claims, the following terms take the meanings associated herein, unless the context of the term dictates otherwise.

The term "presentation" refers to the visible portion of the document such as the text and layout that would appear if the document were printed.

The term "tag" refers to characters inserted in a document that delineates elements within an XML document. Each element can have no more than two tags: the start tag and the end tag. It is possible to have an empty element (with no content) in which case one tag is allowed.

The terms "markup language" or "ML" refer to a language for special codes within a document that specify how parts of the document are to be interpreted by an application. In a word processor file, the markup language specifies how the text is to be formatted or laid out.

The term "element" refers to the basic unit of an XML document. The element may contain attributes, other elements, text, and other content regions for an XML document.

The XML content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

The term "XPath" is an operator that uses a pattern expression to identify nodes in an XML document. An XPath pattern is a slash-separated list of child element names that describe a path through the XML document. The pattern "selects" elements that match the path.

The term "side-effect change" refers to a change that is made in response to another change.

The term "document" may consist of arbitrary XML that describes the properties which are defined in the associated content type, as well as the other markup languages that may be used to describe the actual surface content of the document:

The term "XML data store and/or data store" refers to a container within a document, such as a word processor document, a spreadsheet document, a slide presentation document, etc., which provides access for storage and modification of the data (in XML format, for example) stored in the document while the file is open. Further definition of XML data store is provided below with respect to FIG. 2.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word processor application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

A number of program modules and data files may be stored in the system memory 104 of the computing device 100, including an operating system 105 suitable for controlling the operation of a networked personal computer, such as the WINDOWS® operating systems from MICROSOFT Corporation of Redmond, Wash. System memory 104 may also store one or more program modules, such as word processor application 120, and others described below. Word processor application 120 is operative to provide functionality for creating, editing, and processing electronic documents.

According to one embodiment of the invention, the word processor application 120 comprises the MICROSOFT WORD® program from MICROSOFT CORPORATION. It should be appreciated, however, that word processor application programs from other manufacturers may be utilized. The illustration of a word processing application is for purposes of example only and is not limiting of other types of applications that may produce and operate on documents. For example, other application programs 106 which are capable of processing various forms of content (e.g. text, images, pictures, etc.), such as spreadsheet application programs, database application programs, slide presentation application programs, drawing or computer-aided application programs, etc. are equally applicable. An example application program 106 that produces and operates on a variety of different types of documents includes MICROSOFT OFFICE® from MICROSOFT Corporation.

Embodiments may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 2:
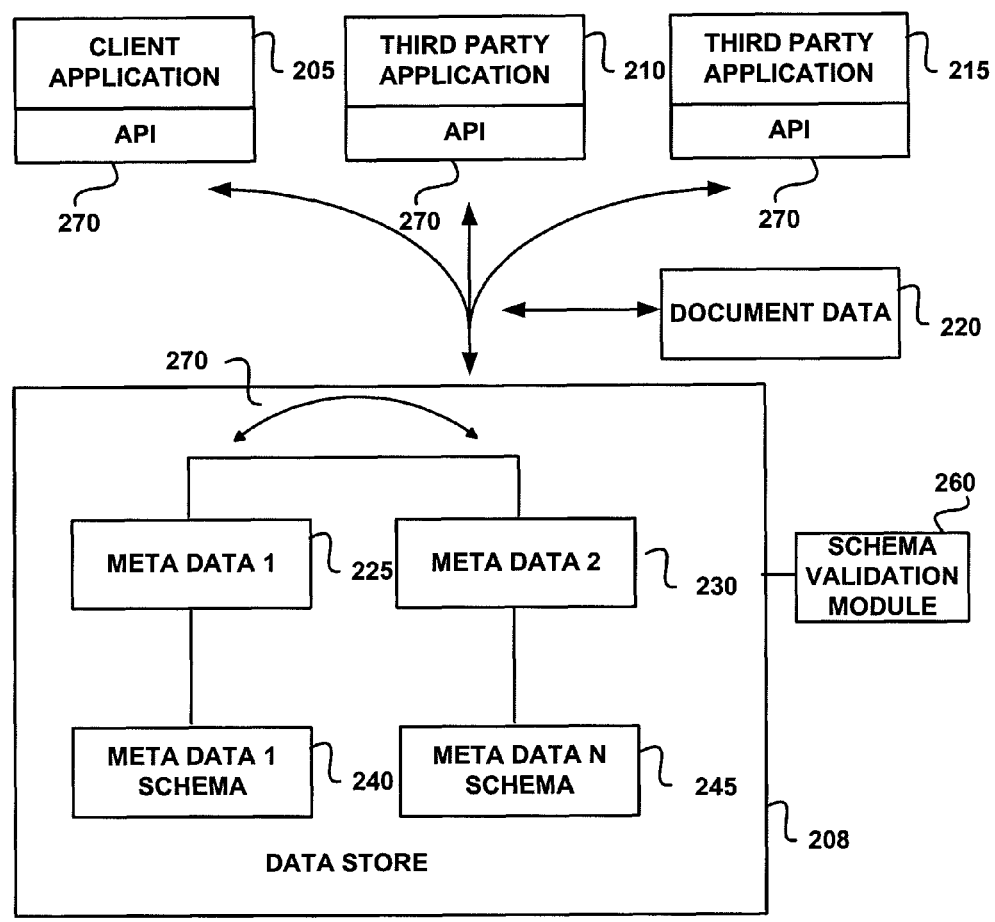
FIG. 2 is a block diagram illustrating a relationship between one or more client applications and one or more data store(s) and the contents of the data store(s)

FIG. 2 is a block diagram illustrating a relationship between one or more client applications and one or more data stores and the contents of the data store(s). Generally described, one or more data stores are maintained separately from a primary presentation storage within a document for storing, relating and for allowing use of arbitrary data across data consumers that are associated with a computer-generated document. Data for structuring information associated with a document, such as document metadata, is maintained in a data store where relationships between different pieces of data are maintained. The data store exposes application programming interfaces (APIs) to the various pieces of data in the data store for allowing different applications to access and operate on one or more of the data pieces. As used herein, the terms "data consumers," "applications" and "processes" may be used interchangeably unless the context clearly dictates otherwise.

The pieces of data may be structured according to a markup language such as the Extensible Markup Language (XML). XML schemas may be associated with each piece of data, and the data store may validate the XML structure applied to the data based on an XML schema associated with a given piece of data to ensure validity of each request. The data stores may contain any number of arbitrary data items, for example metadata, structured according to the Extensible Markup Language (XML). Accordingly, document solution providers may store arbitrary metadata as XML with a given document and have that information processed by a given solution having access to the data upon the occurrence of an event such as when data is removed or loaded to the data store and/or when the document is opened/edited/saved by a user.

Programmatic access is also provided to the data in its XML form while the document is being edited. According to one embodiment, a standard mechanism is provided that is familiar to solution developers via which the data may be accessed and modified programmatically while the document is open. This programmatic access is designed to mimic standard XML APIs. Programmatic access to the data is provided via application programming interfaces to one or more editing client applications (for example, document editing or creating applications and/or third party application add-in solutions, and the like). Accordingly, multiple client applications may access and edit the same piece of document data, and any conflicting changes to a given piece of data are resolved. Data consumers may make side-effects changes in response to any given change. For example, in response to setting a company name to "Microsoft," a data consumer may change a stock symbol to "MSFT." In addition, changes to data and any associated side effects may be "bundled" by the data store so that undoing one or more changes reverses all related changes. This assists in removing the burden of development from the data consumer itself to ensure that it has reversed all changes when the user initiates an undo of the original change from the document surface, for example, by pressing an Undo command.

Standard XML schemas (XSDs) may also be used to define the contents of any of the pieces of custom XML data associated with document metadata in order to ensure that XML data applied to the document data are valid. These schemas may be attached to any instance of XML data stored in the document, and the data store may be configured to disallow any change to the XML data that would result in the XML structure (that is, the XML tags as opposed to their contents) of that data from becoming invalid. This helps to ensure that the solution developer can attach a specific piece of XML metadata to a document and ensure that the XML data will continue to be structurally "correct" according to the associated schema, regardless of which data consumers (for example, add-ins) are used to modify that data. The schema may be stored in a computer-readable medium, such as in a file or on a hard drive.

Referring now to FIG. 2, the document data 220 includes XML structure data and associated document data representing the surface or presentation level view of a document. For example the document data 220 may include XML structure (e.g., heading tags, body tags, conclusion tags) and associated surface view data (e.g., words, sentences, paragraphs) of a word processing document, spreadsheet document, slide presentation document, and the like.

The data store 208 is a document data repository for storing one or more pieces of structured data associated with one or more types of data associated with a given document. Although only one data store is illustrated, more than one data store may be utilized. The metadata1 225 (structured data item) may include XML structure data and associated data for a first piece of metadata associated with the document. For example, the metadata1 225 may include XML structure data (e.g., date tags, name tags, etc.) listing the document author, date of document creation, date of document last change/save, and the like. The metadata2 230 (structured data item) may include XML structure data (tags) and associated metadata representing a second piece of metadata associated with the document. The metadata1 and metadata2 are for purposes of example and are not limiting of the variety and number of different types of data that may be maintained in the data store 208 in association with a given document. For example, as described herein, arbitrary data may be structured and added to the document by one or more software applications as desired by solution providers or users having access to the document data.

A schema file 240, 245 may be optionally attached to each piece of data stored in the data store 208 for dictating the syntax and validation rules associated with Extensible Markup Language (XML) data applied to each piece of data 225, 230. XML schema files provide a way to describe and validate data in an XML environment. A schema file states what XML markup data, including elements and attributes, are used to describe content in an XML document, and the schema file defines XML markup syntax, including where each element is allowed, what types of content are allowed within an element and which elements can appear within other elements. The use of schema files ensures that the document (or and individual piece of data) is structured in a consistent and predictable manner. Schema files 240, 245 may be created by a user and generally supported by an associated markup language, such as XML.

This schematization of the document allows the data store to provide the ability to "guarantee" the structural validity of the document by rejecting any change that violates a given schema file at the data store level. According to one embodiment, the data store 208 utilizes a schema validation module 260 for validating XML structure added to or changes made to a given piece of data against an associated schema file. For example, if a document creator or editor makes XML structural changes to a given piece of data, for example, the metadata1, wherein the editor adds or removes a given XML tag, the data store 208 will utilize the schema validation module to check the XML structural changes against the associated schema file to ensure the validity of the change. If the change is not valid, an error can be generated to the editor. As is understood, such control of the XML structure applied to a given piece of data allows for structural consistency and predictability which is especially important for allowing client and third party applications to interact with associated data. Any data consumer may provide a schema that may be used to validate the data.

The data store 208 provides one or more application programming interfaces (API) 270 which can be accessed by client applications 205 (e.g., word processing applications, spreadsheet applications, slide presentation applications, etc.), as well as, third party applications 210, 215 via the object models (OM) of the respective applications 205, 210, 215. These APIs allow client applications and third party applications to load any existing XML file into a given document's data store 208, thus ensuring that that data is now part of the document and will travel within that document for its lifetime (e.g., through opening/editing/saving/renaming/etc.) or until the data is deleted from the data store. According to one embodiment, the data in the data store is available in its XML format even when a source application for a given piece of data 225, 230 is closed or is otherwise not available. That is, a given piece of data 225, 230 may be accessed via a set of APIs. As described below, the APIs also allow client and third party applications to make changes to the XML markup data applied to the data items 225, 230.

Once XML data 225, 230 is loaded into the data store for association with a document 220, it can be manipulated as standard XML using the data store interfaces designed to provide similar methods to existing XML editing interfaces in order to leverage developers' existing knowledge of the XML programming standard. This allows users to perform standard XML operations on XML data added to the data store for a document, such as adding elements and attributes, removing elements and attributes, changing the value of existing elements/attributes, and reading the values of any existing part of the associated XML tree. Using these XML standard operations, solutions may store structured complex metadata with a document. For example, a third party application 215 may be written for locating and extracting document author names and document creation dates from a number of documents by reading the metadata1 225 added to the data store 208 for each document. The example third party application may be an application programmed for making a list of document author names and document creation dates for all documents created by a given organization. In accordance with embodiments of the present invention, the third party application may utilize the XML structure applied to the metadata1 for efficiently locating and extracting the desired data. For example, the third party application may be written to parse the XML structure of the metadata1 file to locate XML tags, such as <docauthor> and <doccreationdate> for obtaining and using data associated with those tags. As should be appreciated, the forgoing is just one example of the many ways one or more applications may interact with structured data that is associated with the document via the data store 208.

In addition, the data store 208 provides any number of API interfaces 270 to any individual piece of XML data 220, 225, 230 (also known as a store item) to enable multiple applications 205, 210, 215 to work with the same piece of data. For example, several solutions, such as a client application (e.g., word processing application) and third party application solutions (e.g., the third party application described above), may work with the same set of document properties (e.g., properties contained in the metadata2 230 file). Using the data store 208, each of these applications receives separate access to the desired XML data 230 through their own data store API interface 270 for allowing each application to communicate with the data via its own object manager without having to deal with the complexity of having multiple data consumers accessing the same piece of data.

In order to allow for these multiple applications 205, 210, 215 to access the same data, the data store 208 notifies each of these applications when any part of the XML data is changed by another application so that a given application may respond to that change (both internally to its own process and externally by other changes to the same data). When one application requests a change to a given data item, that request is automatically sent to all other applications to allow other applications to decide how or if to respond to the requested change. According to one embodiment, this is accomplished by allowing each application to register to "listen" to any part of the XML data to which it has an interface so that a given application solution/program only receives those messages which are pertinent to its own logic. For example, one type of application 210 may wish to register to listen to all changes made to a given XML data in order to provide detailed business logic capabilities to a third party solution, but another type of application 215 may wish to only listen to changes to one or two specific XML elements within the same data because its logic does not care about changes to any other part of the XML data.

According to this embodiment, the multiple applications 205, 210, 215 may access and edit the same piece of document data, and any conflicting changes to a given piece of data are resolved. For example, "side effects" to any given change may be made when one change by one application causes a side effect change by another application. For example, a first application 210 may be tasked with extracting company names from one or more data items 225, 230 associated with a given document for translating those names into corresponding stock symbols, if available, for compiling a list of company stock symbols related to a given document. If a second application 215 causes a given company name in a given piece of metadata to be added or to be changed, for example, changing a company name from "Company ABC" to Company XYZ," the first application may listen to this change for automatically updating its list of stock symbols to include the stock symbol for "Company XYZ" instead of "Company ABC." In addition, such changes and any associated side effects may be bundled by the data store 208 so that undoing one or more changes reverses all related changes.

Figure 3:
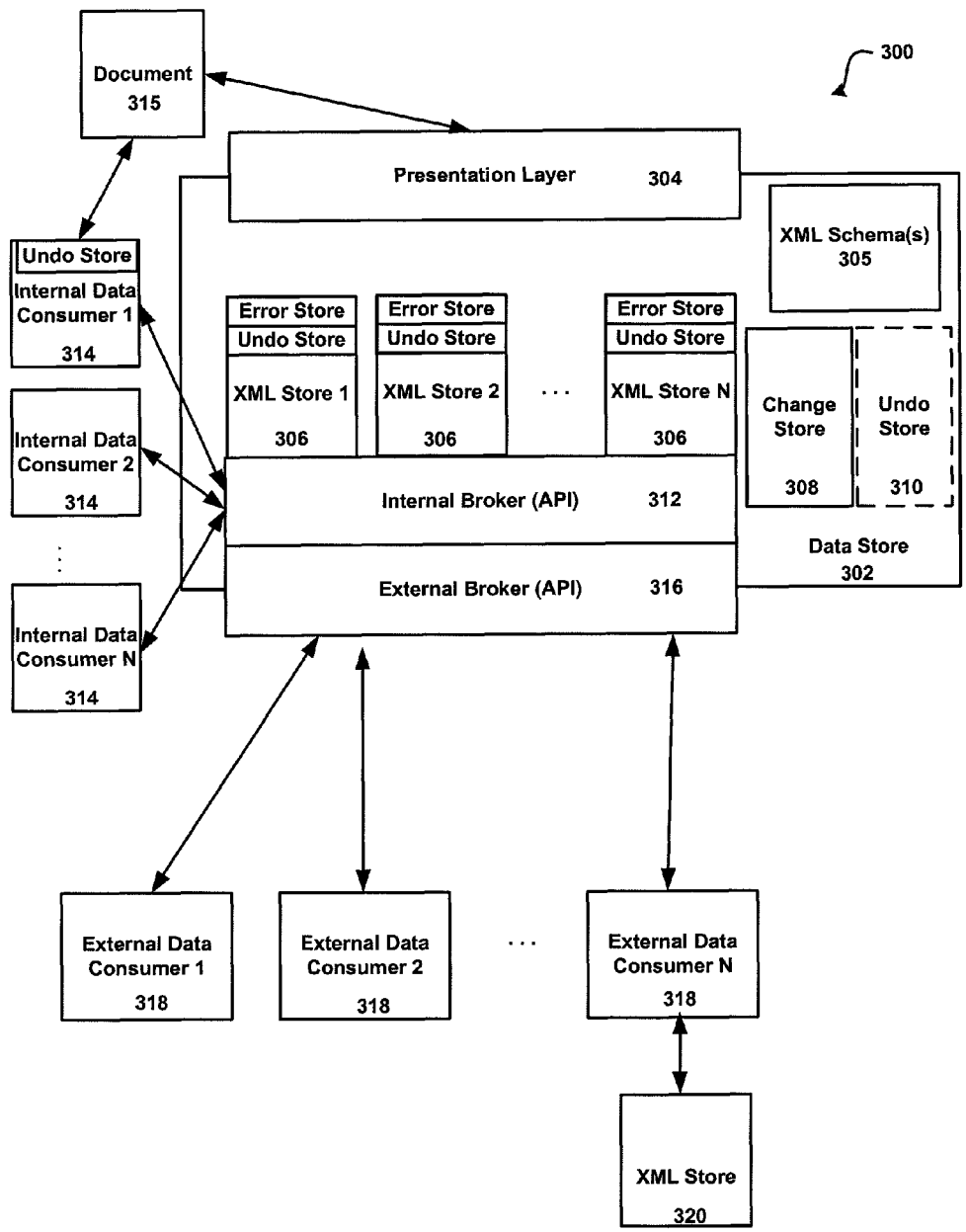
FIG. 3 illustrates a system diagram showing the interaction between the internal and external data consumers with the XML data stores.

FIG. 3 illustrates a system diagram showing the interaction between the internal and external data consumers with the XML data stores. As illustrated, system 300 includes document 315, a data store 302, a presentation layer 304, XML stores 1-N (306) within data store 302 that each include an error store and an undo store, a global change store 308, an optional global undo store 310, an internal broker 312 that is coupled to internal data consumers 1-N 314, XML external store 320 and an external broker 316 that is coupled to external data consumers 1-N 318.

Using the data store 302 and the XML Data Store(s) 306, documents have the ability to contain any number of arbitrary data items (as long as each conforms to standard XML syntax). Arbitrary metadata may be stored as XML within a document and that information may be automatically round-tripped when the document is opened/edited/saved by the user.

As discussed above, programmatic access to this data is provided via an API that may be utilized while the document is being edited, providing a standard mechanism familiar to solution developers via which this information can be accessed and modified programmatically while the document is open. According to one embodiment, this programmatic access is designed to mimic standard XML interfaces. Using the API, data can be added/removed while the application, such as a word processing application, is running; data can be populated within a store item (a part within the data store); data can be manipulated using standard XML constructs; schemas can be associated with any arbitrary XML data in the data store; schemas can be added/removed/changed once associated with the data store item; and XML changes can be evented to any listening clients. As illustrated, the API comprises an external broker 316 that provides an interface for the external data consumers 318 and an internal broker 312 that provides an interface for any internal data consumers 314 that interact with the data store 302.

Manipulations to data store 302 may occur in real time. As discussed above, the data stores 302 and 306 may contain one or more types of data. For example, a company might have one data store that they're using to store all the different types of data they want to store within a single data store, while another company might want to store data different types of data across different data stores.

A data consumer (internal 314 and/or external 318) may register for events that relate to actions concerning data within the data stores. For example, a data consumer may register to receive an event when any type of change is made to one or more of the data stores. Another data consumer may register for changes that have happened to a certain element or set of elements within a data store. Common events include, adding an item, changing an item, and deleting an item from one of the data stores. When the event occurs, each data consumer that has registered may react to the change while the state of the data stores is maintained consistently. Many times, a data consumer will not perform any actions when a change is made. At other times, the data consumer will perform some action(s) in response to the event. For example, a data consumer may make some other changes to the data store in response to the change such as, in response to a title change, updating headers within the document. The data consumer may also perform some other operations that do not affect the document. For example, if stock ticker symbol is inserted, the data consumer may retrieve data that is associated with that stock symbol even though all of the retrieved data may not be displayed within the document at the presentation layer. The data consumer may also reject the change using its own validation logic. For example, if data consumer 1 receives a change they do not accept, that data consumer may return a flag to the broker indicating that the change is not accepted. Whenever a change is not accepted, the change is rolled back, along with any side effects, such that the change never occurred. Each XML store 306 may utilize its undo store to undo the changes it has made. Alternatively, the global undo store 310 may be utilized to undo the changes made across the data stores. Imagine there are three data consumers that are interested in what's happening to document properties, so each of these data consumers have registered to receive an event relating to a change of the properties. When a change is made, the data store determines each data consumer that has registered and informs each of them of the change in a predetermined order. Each data consumer, in turn, may perform some action in response to the change. If the change, or any of the changes made by the registered data consumers as a result of the change, are not accepted by any one of the data consumers, all of the changes relating to the initial change are undone.

The external broker application programming interface layer 316 provides access to the data store 302 by the external data consumers 318 and allows third-party clients to interact with the data store 302 just as the internal data consumers that are associated with the application interact with the data store. Each of the XML data stores 306 within the data store 302 are provided with a unique ID for identification purposes. This helps in locating the XML data stores 306.

At any point in time, a data consumer may add a schema that is used to validate the data within a data store. When a schema is added and a data consumer attempts to change any of the data, the data store determines whether the change makes sense with the provided schema. Once a schema is attached, the broker becomes a validating object.

Custom-defined XML schemas may be used to provide semantic markup around contents within a document, such as a word processing document, a spreadsheet document, and the like. This powerful functionality allows developers to create solutions which leverage this custom XML embedding to work directly against the structure and content of their data rather than requiring their solution to handle the complexities of the underlying application's presentation format.

For example, if a user were to create a cover page for an equity research note in an application which was not XML-capable then extracting the useful data (e.g. the company name, the stock ticker symbol, the stock rating) would require use of the application's object model which is intimately tied to the presentation format of the document. This necessarily meant that the resulting solution logic was also tied to the presentation format of the document, and subject to failure if that presentation were to change. For example, if the code expects the sticker symbol to be in column 3, row 2 of the first table, adding a new row/column would break this logic. With XML-enabled applications, however, this code can now be linked to the structure of the customer's own data, removing the necessity of the logic to be tied to the presentation. That same logic could search for the contents of the <stockSymbol/> XML node, and find it wherever it existed in the document to edit it, even if its contextual presentation had changed drastically.

An XML schema often envelopes several types of data, including: metadata (e.g. author data for storage/processing); body data (e.g. the company being reported on); and tabular data (e.g. stock price histories). These data types, however, are not mutually exclusive. In fact, they are usually vastly overlapping regions within the same XML document. Ideally, although this data is all expressed by a single XML schema, these various data 'types' could each be edited, etc. in environments specifically tailored to the optimal expression of that data. For example, a form could appear to allow the user to easily edit the metadata for the document whereas the document body is editable via a word processing application. This occurs in real time, such that the user could fill out parts of the document and form simultaneously.

The data stores may also receive more than one element at a time. Providing the data (XML) as one particular stream may help satisfy the schema in some situations. For example, suppose that an attached schema says that if stock data exists it must have at least two companies. If the stock data were added one by one it would not be valid.

According to one embodiment, a single pass is used to validate the data. Instead of making two passes which can result in a change being made to the data store, the validation is performed before the data is committed to the data store. This helps to prevent a data consumer from introducing errors into the data store.

As discussed herein, the XML data that is associated with a document can now be stored separately from any specific application document in a central XML data store 302. Multiple environments may be created for the presentation/editing of one piece of XML data. The expressions of that data are automatically synchronized through their connections to the same data in the XML data store. As such, multiple applications can simultaneously display the same underlying XML data. This means that the user is afforded the ability to edit the same data in the application that is 'the best tool for the job.' For example, a form for editing the metadata information, a word processing document surface for editing the freeform sections of the data, etc. This also means that the user can edit the data in multiple applications as desired. If the same information appears in multiple applications, the user can edit that data in any of them as desired based on their current editing context.

Although each application now has concurrent access to the entire XML data that is associated with the document, each application can individually make the choice of whether to display and edit any part of that data. This means that each application needs only to display the parts of the data which are relevant within that context. For example, all XML data might be displayed in the document, but another application might only be interested in the values of one XML node within the data, and therefore needs only to display that part of the data without worrying about 'carrying around' the rest of the XML structure to ensure context.

The user can edit the data in any application displaying the same XML information and immediately have that data updated (along with any applicable business logic) in all locations which are referencing that part of the data. This ability to receive real-time messages for each XML change is helpful, as it allows the creation of editing environments which reflect the overlapping nature of various editing requirements within a single XML document.

The applications may also share error information. A user-defined collection of content errors may be stored in each data store. For example, business logic may dictate that a <startDate> node must have a value before the <endDate> node. In order to allow multiple data consumers to collectively share their errors, an error store is included within each of the XML stores that stores lists of nodes in the XML+an error (consisting of error text and a name). Just like the XML changes, one client can create an error and that error change is broadcast to each client in turn. As such, multiple applications can rely on a single implementation for the validation logic to be shared against all representations of that data. In other words, the same logic does not need to be replicated in each application which is displaying the XML data.

An undo store may be a global undo store 310 and/or the undo stores may be included with each XML store. Change requests of each data consumer may be concatenated into a single undo stack, such as undo store 310, which combines each change with all related changes, so that each can be undone as a unit. This allows all clients to request the 'undo' of the last entire change, keeping the entire document in a known "good" state.

The synchronization of the data is not limited to a set pre-defined group of data consumers. In other words, new data consumers can register for notification at any time, on any XML data and immediately be capable of editing the same data as all other clients. For example, initially only external data consumers 1 and 2 may be sharing data. At a later time, one or more data consumers may register with the data store and begin sharing the data.

One data consumer acts as the 'owner' of the XML data and is responsible for: maintaining the persistent form of the XML data; providing a copy of the data to requesting data consumers; receiving change requests to the data from the data consumers; and sending notifications of changes to the registered data consumers. According to one embodiment, the data store acts as the owner and handles all updating and notification for each of the data consumers. The XML data store includes a set of interfaces that are available to different applications, such as a word processing application, a spreadsheet application, a slide presentation program, and other data consumers. The interfaces are directed at: obtaining desired pieces of XML data; notifying the data store of changes a data consumer would like to make to the data store; and registering to receive notifications from the XML data store about changes made to that store item by other data consumers.

Whenever the data store notifies a data consumer of a change, the data consumer can: do nothing and accept the change; request one or more side-effect changes and reject the change. The side-effect changes generally involve the addition of logic that initiates changes in response to other changes that are made to the data store. For example, a data consumer that uses an equity research note may want to receive notification when the <stockSymbol/> node within the data store is changed, and in response to the change submit the data to a web service and update the <stockData/> subtree that is within a data store.

Side-effect changes are bundled with the original change for the purposes of undo/cancel, and they are handled differently by the data store. They are handled differently since the side-effect changes are requested in response to a change that hasn't itself yet been committed to XML data store.

If a data consumer (314 and/or 318) requests a change to the XML data store 302, that change can be rejected for different reasons, including: the change is invalid (e.g. XML that is not well-formed); the change was rejected by some logic within a data consumer; and the like.

Some data consumers may keep their own version of the data in a store 320 that is maintained separately from the XML data store 302. Maintaining multiple copies of this XML data may lead to problems, including that the copies may get out of sync (e.g. the 'Title' in the property panel doesn't match the 'Title' displayed inline in the document). To address this problem a single "master" copy of each piece of XML data is maintained during a session. This master copy is then used by multiple data consumers during a session. When the session ends, the other copies of the data may be updated to reflect the current state of the XML data store. According to one embodiment, the data store 302 is configured to merge the same items from the different data stores and then save each copy back out at a later time. When a request for a common data item is received, the data store 302 wraps those two data store items in a single parent node; creates a merged XSD that imports the schemas that are associated with each data item; and delivers the interface for this store item to the data consumer.

The data store 302 is configured to detect excessive recursion and when detected, cause an automatic failure if the data store detects a loop of side-effects in response to a given change. According to one embodiment, a loop that exceeds either 16 levels in depth or 1000 total side effects is considered excessive. The data store may also be configured to automatically reject any change and its side effects, when the change is found to be structurally invalid by the XML data store. This means that if a structural change is requested by a client and found to be structurally invalid then the data store restores itself to the last known good state and produces an error that may be delivered to the other data consumers.

Each data consumer (internal 314/external 318) may also reject invalid changes. For example, a data consumer may include its own validation layer. If a change is requested within a data consumer that it invalid, that change may be rejected by its existing validation layer, and rolled back out of its own data store without notifying the XML data store. If that change originated from the XML data store, then the data consumer returns a rejection to the event thrown by the data store, and the data store initiates a cancel to its 'last known good' state.

In the case of changes requested by other data consumers to the data store, the data store attempts to validate those changes if it has an XML schema collection (305) associated with the current data. If schemas are present, then the data store rejects any structurally invalids.

In order to support data binding, the internal application data consumer, such as internal data consumer 1 314, handles the interaction between actions in the XML data store, and on the document surface 315. When a user edits a data bound field, that change affects the content of the document (thus adding a record to the application's undo stack), but also affects the XML content of the data store (thus adding a record to the data store's undo stack). In order to help ensure that the surface and data remain in sync at all times, the application's undo stack (which the user interacts with) is capable of 'bundling' surface changes into one undo record, along with a corresponding XML data store undo reference, ensuring that undoing the top item on each stack keeps the application and the data store in an identical state.

Different alternatives are available to handle user-initiated undo, including: maintaining separate undo stacks for each data consumer including the host application; share a global undo stack; and limiting undo for a data consumer based on the current focus.

When a global undo stack is used, the data consumer passes through the undo requests directly to the host application, which then takes the last item off of its undo stack (undo would be the same regardless of where focus was in the app frame). This implies that all changes to the XML data store are funneled onto the host's undo stack with some generic record (e.g. "Undo Property Edit"). For example, if the user types "Microsoft Corp." into the <company/> field in a word processing application, then that operation causes the data store's undo stack to include that action. Next, if the user was to press undo in the word processing application to remove that text, the word processing application undoes the last operation on its undo stack (and notifies the data store to undo the last operation on its stack), which would result in the other client doing that action. Conversely, if the user had then typed some non-bound text in the word processing application and pressed undo in the panel, the other client would drop that request through to the host, which would remove the last action from its undo stack (in this case, the editing to the doc surface):

When a data consumer rejects a change sent by the XML data store, the XML data can end up in a 'bad' business logic state. For example, assume there is business logic that performs checks on an expense report. The logic includes checking if a line item is over $100; and if so, the data consumer rejects the update of <lineItemAmount/>. If not, the data consumer updates the total with the new line item amount. If the total is over $500 then the data consumer rejects the update of <reportTotal/>. Now using the above logic, assume that a user enters an invoice line of $50 that moves the total above $500, the first logic check succeeds, but the second logic check rejects the update of the total. This means that if just the last change was undone, then there would be an invoice where the sum of the line items does not match the total. As a result, according to one embodiment all of the side-effects of the original change are undone.

The data store 302 acts as a transaction mechanism that allows the bundling of these transactions together for the purposes of undo. According to the embodiment, three different alternatives for handling 'rejections' are used. First, the data store may issue undo changes to return to a valid state (also called 'rollback'). Second, undo and cancel have non-parity, and third, no client is able to cancel.

The first alternative is to have the XML data store issue undo changes to get back to a valid state. This essentially undoes all operations back to the change which triggered the business logic error. In this alternative, the XML data store could issue change requests with an 'undo' flag set to TRUE and have the data consumer perform these changes on its own; and the XML data store could issue change requests with its 'undo' flag set. The following is an example.

```
User edits node A in a Client 1 {
    (Client 1 does internal logic)
    Tell XML Data Store{
        Store Updates
        Tell Client 2 about A{
            Change B{
                Queue it up, return OK
            }
        }
        Tell Client 1 about B{
            Internal Logic
            Change C{
                Internal Logic
                Tell XML Data Store{
                    Queue it up, return OK
                }
                OAC
            }
        }
        Tell Client 2 about C{
            Change D{
                Queue it up, return OK
            }
        }
        Tell Client 1 about D{
            Internal Logic
            REJECTION
            Rollback DOM change to D
            Return FAIL
        }
        Tell Client 2 to undo D
        Tell Cleint 2 to undo C
        Tell Client 1 to undo C - *undo while exiting after a rejection*
        Tell Client 1 to undo B - *undo while exiting after a rejection*
        Tell Client 2 to undo B
        Tell Client 2 to undo A
        Return FAIL to initial change request
    }
}
```

In essence, the data consumer accepts the two XML data store calls (requests to undo changes B and C while exiting the parent change A), or else the two XML document object managers fall out of sync.

Another alternative is to keep the current disparity between cancel and undo, insofar as that having the data consumer 'cancel' the current change can leave the solution in an invalid business logic state. In this case, the XML data store rolls back *only* the change that was rejected/cancelled, undoing that change, but would then just stop—not undoing any further changes that are on the store's undo stack.

Data consumers may also maintain their own unique undo stacks. The applications, however, should be 'smart' about not adding additional actions to their undo stacks when the topmost action on their stack matches the requested operation from the other side of the live sync boundary. For example, if the user types "Microsoft Corp." into the <company/> field into the word processing application, then that operation will be 'live synced' and result in an undo action appearing on each registered data consumer's undo stack. Next, if the user was to press undo in the word processing application to remove the text that was just entered, the word processing application would undo the last operation on its undo stack (and tell the data store to undo the last operation on its stack), but this time the data consumer would see this request and take the last action off of its undo stack (including any side effects) because the store's undo stack must necessarily match the data store. If the user had then pressed undo in the data consumer, the data consumer would remove the last action from its undo stack and the word processing application, upon getting the undo action from the data store, would notice that it matches the last action on its undo stack and remove that as well. Conversely, if the user had then typed some non-bound text in the word processing application (adding undo records to the word processing application) before they pressed undo in the data consumer, the client would remove the last action from its undo stack, and the store would do the same, however, the word processing application adds another action (because the last thing on the undo stack is not the last XML change). However, the word processing application would store that change along with the fact that the store needs to perform a redo to get back to its original state.

Another alternative involves making the data consumers aware of each other. Undo control could be passed between the data consumers. For example, if the user edits the <company/> field in one application, which is then broadcast to another data consumer, then the undo stack would look like:

| Store | Application | Data consumer 1 |
|---|---|---|
| Marker (pass to Data Consumer 1) | Company → "Microsoft Corp." + store undo | Company → "Microsoft Corp" |

In this case, the undo record on the XML data store would not host the transaction. Rather, it would host a marker that allowed it to pass control to the client to complete the undo action. Assuming the user then went into the word processing application and performed an undo: the application's canvas would update back, and then pass control to the data store. The XML data store would try to undo the last transaction, but see the marker and pass control to the data consumer for that undo. The data consumer would perform the undo request to the store, which would then broadcast it as an undo to all other clients. This means that if the user performed an action in the client, followed by an action on a different field in the word processing application, the undo stacks would look like:

| Store | Application | Data consumer 1 |
|---|---|---|
| Marker (pass to Process 1) | Company → "Microsoft Corp." + store undo | Company → "Microsoft Corp" |
| Date → "Jan. 20, 2005" | Date → "Jan. 29, 2005" + store undo | Marker (pass to host) |

In this case, if the user's next action was an undo in the host application, then the host (and the data store) would do the undo action, which the data consumer would perform on its own DOM and throw away the undo marker. If the user's next action was an undo in the data consumer, then the data consumer would give control for this action to the host (because the top action is just a 'marker') and the same host undo would be performed.

FIG. 4 illustrates an example of live synchronization. In one of the simplest cases, 'live sync' refers to the ability for user edits to the XML data presented in one location (e.g. a word processor application) to be reflected in the UI of another location/application in real time. While the document is being edited, changes which affect the XML data are delivered to the other registered data consumers that are interested in the data, such as both the word processing application and the property panel. This helps to ensure that the content of each application's XML data remains the same.

Referring to window 400, a document 415 is open for editing and a property panel 420 is showing. The title is shown in both the property panel (405) as well as in the document (410). Suppose that the title 405 in window 400 is changed from Data Binding-Live Sync Integration to Foo Bar Biz, as illustrated in title 435 and title 440 within window 425. As soon as the title is updated within the property panel title 435 the change is sent to the word processing application such that it can accept or reject the change. In this example, the application accepted the change to the title that was made using the property panel application and the title 440 within the document is updated.

FIGS. 5-8 illustrate processes for real time synchronization of XML data between data consumers.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

Figure 5:
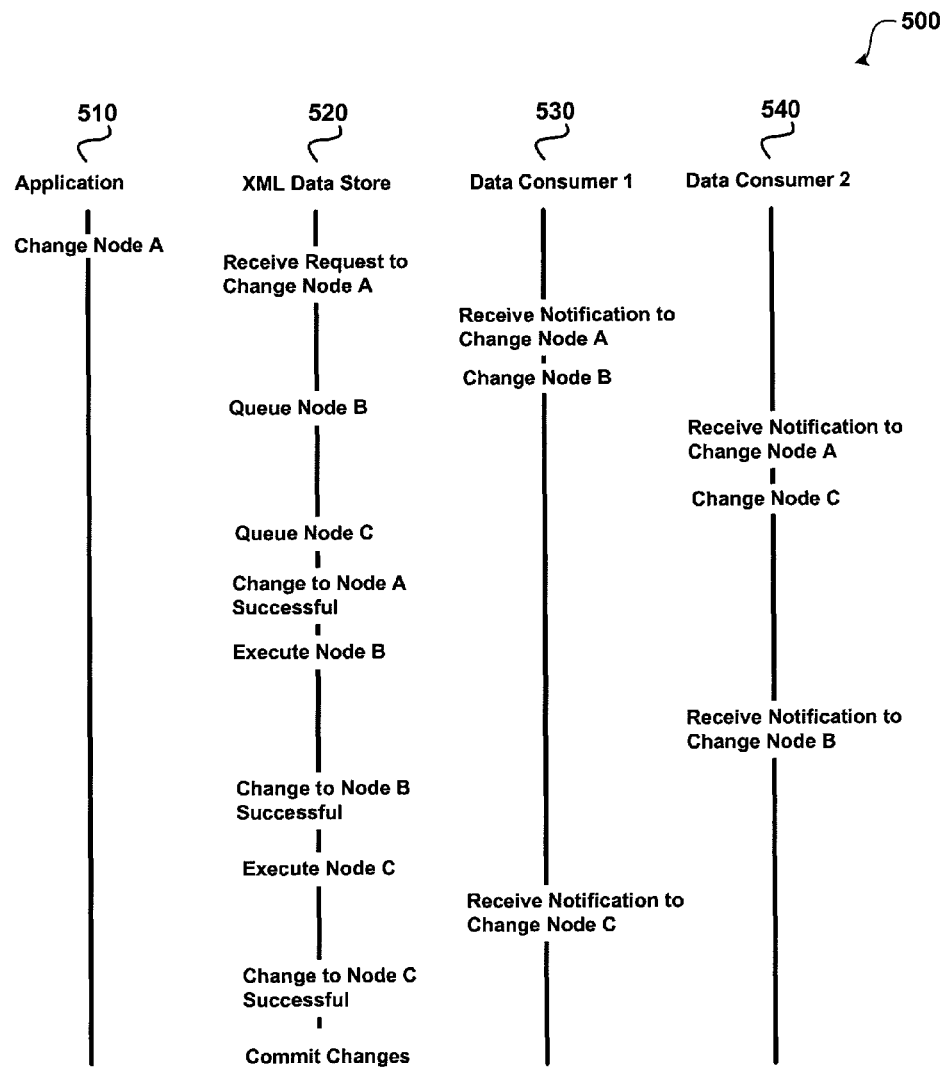
FIG. 5 illustrates the interaction between two clients and an XML data store.

FIG. 5 illustrates the interaction (500) between two clients and an XML data store.

The data store 520 receives a user edit to node A made using application 510. Data consumer 1 530 receives notification of the change to node A from the data store 520. As a result of the change to node A, data consumer 1 requests a side-effect change to node B. The data store 520 queues the side-effect change B for later execution. Once all of the side-effect changes have been queued from data consumer 1, the data store 520 notifies data consumer 2 (540) of the change to node A. Data consumer 2 requests a side-effect change to node C. In response, the data store queues up the node C change for later execution. At this point, the processing relating to node A has completed but there are still pending side-effect changes to node B and to node C. As data consumer 1 requested the change to node B, the data store sends notification of the proposed change of B to data consumer 2. Data consumer 2 does not make any changes in response and accepts the change. Similarly, data consumer 2 requested the change to node C, so the data store sends notification of the change of node C to data consumer 1. Data consumer 1 accepts the change. In this example, all of the changes have been accepted by all of the interested data consumers. Therefore, the data store commits the changes to the data store. In short, the data store allows each data consumer to perform any changes in response to a change, the data store executes and messages these changes in the order they are received thereby allowing them to be messaged serially.

Figure 6:
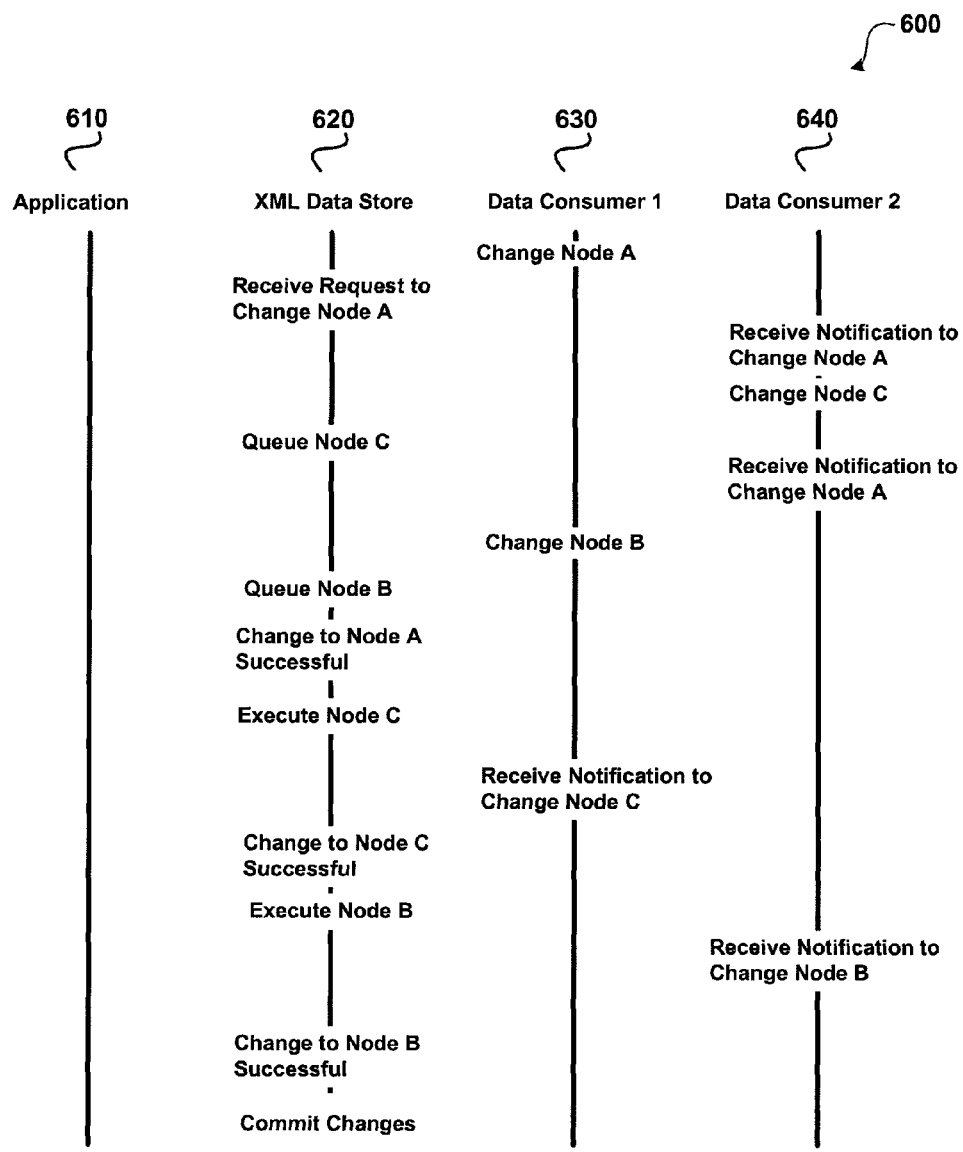
FIG. 6 shows the interaction between two external data consumers and a change to the XML data store.

FIG. 6 shows the interaction (600) between two external data consumers, application (610), and a change to the XML data store.

In the case where the original change was generated by an internal client, such as the application that created the document shown in FIG. 5, the data consumer changes slightly. This example illustrates two basic rules of changes from multiple clients. The first rule is that top-level changes occur depth first. The second rule involves queuing side-effect changes.

The first rule refers to the fact that the side effects of a change happen before any new change can occur. Consider the following example, where data consumer 1 executes a function to make two changes. The first change is made to node A and the second change to node B.

When data consumer 1 (630) requests a change to node A, the notification is sent to data consumer 2 (640) after the XML data store 620 receives the request to change node A. In response, data consumer 2 requests a side-effect change to node C which is queued up by the data store for later execution. Data consumer 1 then requests a change to node B which is queued up since the change to node A has not been completed yet. Data consumer 2 accepts the change to node A, and in response, the data store executes queued side-effect change to C. Data consumer 1 receives the notification of the change to node C and may respond to the change. In this example, data consumer 1 accepts the change. The data store then executed queued side-effect change to B that was requested by data consumer 1. Data consumer 2 receives notification of change B from the data store to which it may respond. Data consumer 2 accepts the change and the changes are committed to the data store.

In this case, data consumer 2 responds first to the change to A, so that the following two lines of code trigger two unique changes:

```
doc.CustomXMLParts(1).SelectSingleNode( ).AddNode("foo","bar")
doc. CustomXMLParts (1).SelectSingleNode( ).AddNode("foo2","bar")
```

A second rule refers to the fact that the side effects of a change are queued up as they are requested and therefore multiple changes may be queued before the first change's side effects occur.

Figure 7:
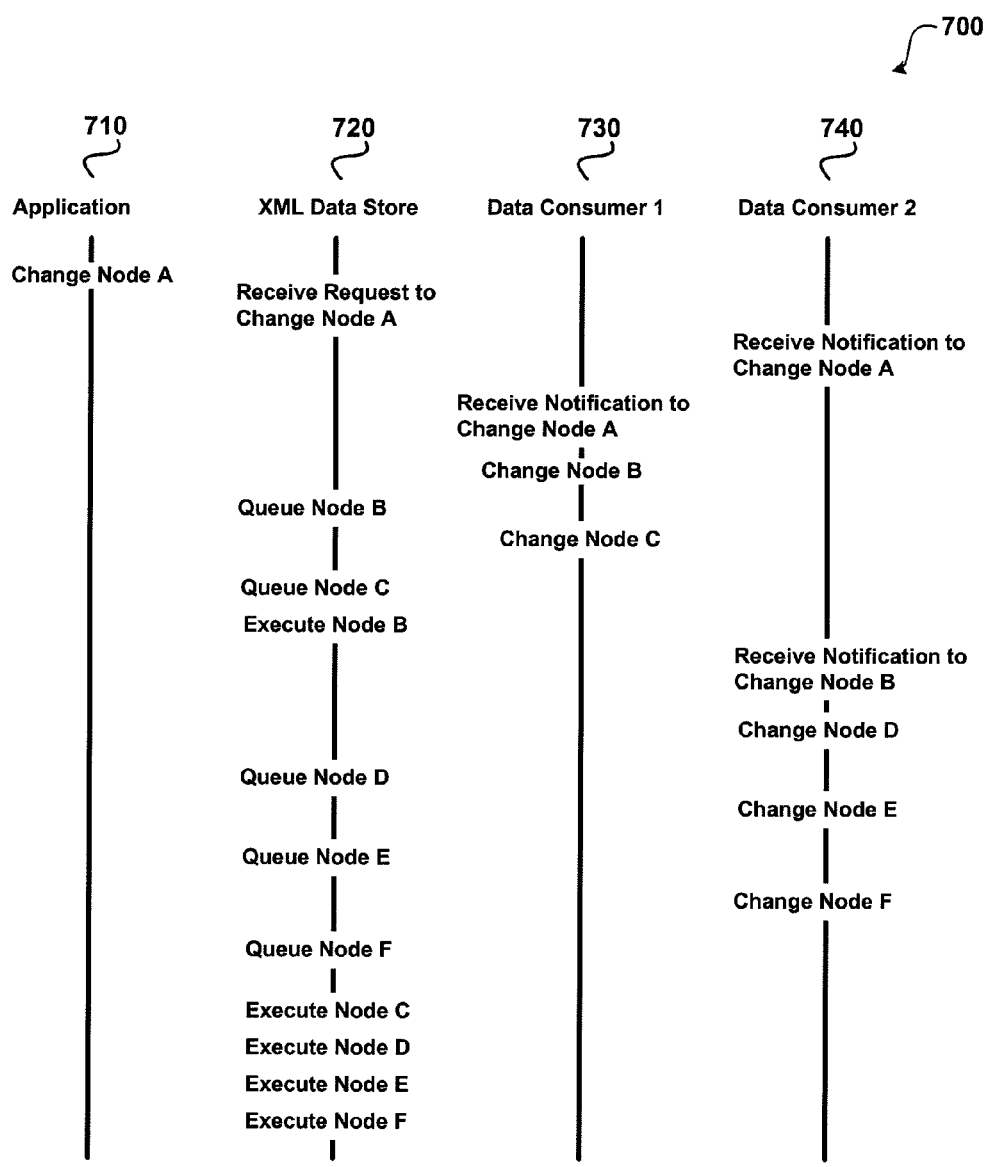
FIG. 7 shows a process involving multiple side-effect changes.

FIG. 7 shows a process (700) involving multiple side-effect changes. FIG. 7 shows Application (710), XML Data Store (720), data consumer 1 (730) and data consumer 2 (740). The following example illustrates the following changes. Suppose that data consumer 1 (730), when it receives a notification that node A is changed, wants to perform side-effect changes to nodes B and C. Data consumer 2 (740), in response to the notification of the change to node B, wants to perform side-effect changes to nodes D, E, and F.

Referring to FIG. 7, it can be seen that data consumer 1 causes all of its side-effect changes as a result of the notification of the change to node A before side-effects relating to the change of node B are executed. Therefore, changes to node C occur before changes to nodes D, E, and F.

Figure 8:
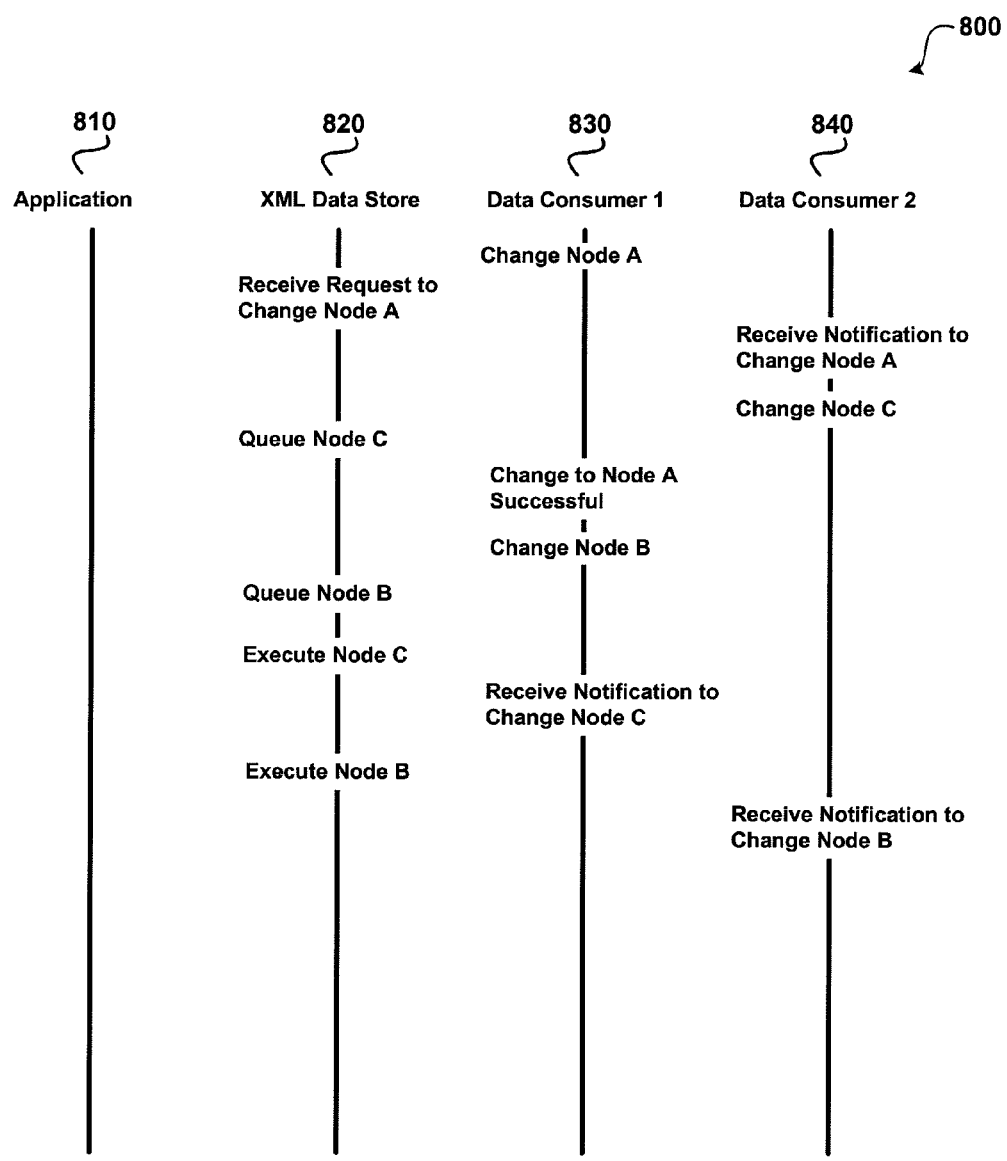
FIG. 8 illustrates a process showing that the caller's side-effects are executed last, in accordance with aspects of the present invention.

FIG. 8 illustrates a process (800) showing that the caller's side-effects are executed last. FIG. 8 includes process (800), Application (810), XML Data Store (820), data consumer 1 (830), and data consumer 2 (840). One can still see that in this case, the side effects generated by data consumer 1 (830) itself will happen after all other clients have had a chance to see the change and generate their own side effects. This is a necessary side effect of the fact that the XML data store (820) informs each client (830,840) of a change (to ensure that each client has a chance to accept/reject that change) before it can return the success condition to the caller, and allow the caller to provide the event with which to do side effects. It is predictable that the data consumer who requested a change should be last, in order to hear whether the change was accepted or rejected by all clients of the XML data store. As well, this helps to ensure that if the two changes are conflicting and not structural, the change of the caller wins which is generally the desired result.

The above specification, examples and data provide a complete description of the manufacture and use of the composition of the invention.

What is claimed is:

1. A computer-readable storage medium having computer-executable instructions for synchronizing data that is associated with a computer-generated document and that is shared across data consumers, comprising:
   storing elements represented by Extensible Markup Language (XML) that are associated with a document in a data store, wherein the data store is maintained separately from a presentation storage representing the presentation view of the document; wherein the document is edited by one or more data consuming applications and wherein a same piece of data within the data store is editable by multiple data consumers concurrently;
   initiating a change to an XML element by a first data consumer;
   determining when there are other data consumers that are interested in the change to the XML element; wherein the determination is based on whether the other data consumers called an application programming interface (API) to register for a notification to a change of the XML element associated with the document, the XML element stored in the data store, and wherein the API provides the ability to specify the other data consumers are not notified in response to a change of other XML elements that are associated with the document, wherein all of the data consumers are data consuming applications;
   notifying the other data consumers of the change, wherein the other data consumers may perform at least one of: accepting either the change; rejecting the change; and initiating a side-effect change as a result of the original change; and
   in response to acceptance of the change by all of the other data consumers notified of the change:
   committing the change to a plurality of application undo stacks, wherein each application undo stack is associated with each data consumer; and
   committing the change to the data store;
   in response to initiation of the side-effect change by any one of the other data consumers notified of the change:
   delaying the side-effect change from being processed until each of the other data consumers receive notification of the change; and
   in response to rejection of the change by any one of the other data consumers notified of the change:
   rolling back the change from the plurality of application undo stacks; and
   rolling back the data store to a state before a time when the change was initiated.

2. The computer-readable storage medium of claim 1, wherein the API provides the ability to access the XML elements within the data store while the document is open and wherein the API allows more than one data consumer to access a same XML element at the same time.

3. The computer-readable storage medium of claim 2, further comprising updating a display that is associated with one of the other data consumers with a value of the XML element that was changed by the first data consumer.

4. The computer-readable storage medium of claim 3, wherein the side-effect change is queued for later execution, wherein the later execution occurs after each of the data consumers has had a chance to accept, reject and make a side-effect change.

5. The computer-readable storage medium of claim 3, wherein committing the change when accepted comprises processing each side-effect and determining whether each side-effect is accepted.

6. The computer-readable storage medium of claim 3, further comprising maintaining an undo list that may be used to return the data store back to the state before the time when the change was initiated.

7. A computer-implemented method for sharing data that is associated with computer-generated documents between data consumers, comprising:
   initiating a change to a structured data item associated with a document; wherein the structured data item is structured according to an Extensible Markup Language (XML) and wherein the data store is separate from the presentation storage for the document; wherein the document is edited by one or more data consuming applications and wherein a same piece of data within the data store is editable by multiple data consumers concurrently;
   providing notification of the change to registered data consumers; wherein each of the registered data consumers are data consuming applications, wherein the registered data consumers call a notification application programming interface (API) to register for a notification to a change in the structured data item associated with the document;
   queuing side-effect changes that are a result of the change for later processing until each of the other data consumers receive the notification of the change;
   determining when a response from any one of the registered data consumers is a rejection of the change, and when the response is a rejection:
      rolling back the change from a plurality of application undo stacks, wherein each application undo stack is associated with each data consumer, and
      rolling back the change and any side-effect changes from all data consumers within the data store to a last known good state;
   determining when each of the registered data consumers accepts the change, and when each of the registered data consumers accepts the change:
      validating the change using an XML schema file that is provided by one of the data consumers through an API,
      committing the change to the plurality of application undo stacks, and
      committing the change to the data store.

8. The computer-implemented method of claim 7, wherein initiating the change to a structured data item that is contained within the data store comprises exposing an application programming interface (API) that provides the ability for the data consumers to access the structured data items within the data store, wherein the API allows more than one of the data consumers to access a same structured data item at the same time.

9. The computer-implemented method of claim 8, further comprising receiving a side-effect change in response to the notification and delaying execution of the side-effect change within the data store until the change has been processed.

10. The computer-implemented method of claim 9, further comprising queuing the side-effect change within the data store.

11. The computer-implemented method of claim 9, wherein determining when each of the registered data consumers accepts the change comprises determining when the change is accepted by each data consumer and when each of the side-effect changes are accepted.

12. The computer-implemented method of claim 9, further comprising, maintaining an undo list that is used to return the data store back to the last known good state.

13. A system for synchronizing data that is associated with a computer-generated document between data consumers, comprising:
   an internal data consumer that is configured to create and edit the document and that is configured to interact with structured data items that are associated with the document, and an internal undo stack in association with the internal data consumer, the internal undo stack configured to commit and roll back registered changes received by the internal data consumer;
   external data consumers that are configured to interact with the structured data items that are associated with the document and maintained separately from the presentation storage for the document, and a plurality of external undo stacks, each external undo stack in association with each external data consumer, the plurality of external undo stacks configured to commit and roll back registered changes received by the external data consumers; and
   a data store that is configured to store the structured data items that are associated with the document separate from the document, wherein a same piece of data within the data store is editable by the internal data consumer and external data consumers concurrently; wherein the data store comprises:
   an API broker that is configured to interact with the external data consumers and the internal data consumer and that is configured to receive a proposed change and in response to the proposed change notify registered data consumers of the proposed change, commit the change to the data store when the proposed change is accepted by each of the registered data consumers; wherein each of the registered data consumers calls the API broker to register for notification of the proposed change; and when the proposed change is not accepted by one or more of the registered data consumers ensuring that the data store is in a valid state, wherein the data store further includes a change store that is configured to store the proposed change and side-effect changes that are associated with the proposed change, and an undue store that is configured to roll back the data store to the valid state; wherein the data store queues the side-effect changes for later execution until each of the data consumers receive the notification of the proposed change.

14. The system claim 13, further comprising structuring the structured data items within the data store according to an Extensible Markup Language (XML).

15. The system of claim 14, wherein the later execution is configured to occur after each registered data consumer has had a chance to accept, reject and make a side-effect change.

16. The system of claim 15, wherein the data store is further configured to process each side-effect and determine whether each side-effect is accepted.

17. The system of claim 15, wherein the data store is further configured to:
   receive a change to an Extensible Markup Language (XML) markup data applied to the structured data item;

read an XML schema file associated with the structured data item to which the change to the XML markup data is directed;
determine whether the change to the XML markup data is valid according to the read XML schema file; and
disallow the change to the XML markup data if the change to the XML markup data is not valid according to the read XML schema file; and commit the change when the change to the XML markup data is valid according to the read XML schema file.

18. The system of claim 15, wherein the data store comprises a plurality of XML data stores that each comprise an undo store and a change store.

19. The system of claim 18, wherein each undo store is configured to communicate with the other undo stores.

* * * * *